United States Patent [19]
Jackson

[11] Patent Number: 5,201,029
[45] Date of Patent: Apr. 6, 1993

[54] DIGITAL DATA PROCESSING APPARATUS USING DAISY CHAIN CONTROL

[75] Inventor: John Jackson, Lindfield, England
[73] Assignee: U.S. Philips Corporation, New York, N.Y.
[21] Appl. No.: 856,883
[22] Filed: Mar. 24, 1992

Related U.S. Application Data
[63] Continuation of Ser. No. 427,411, Oct. 24, 1989, abandoned.

[30] Foreign Application Priority Data
Oct. 24, 1988 [GB] United Kingdom ............. 8824843.0

[51] Int. Cl.$^5$ ............................................. G06F 15/18
[52] U.S. Cl. ..................................................... 395/27
[58] Field of Search ..................... 395/24, 27; 364/807; 307/201

[56] References Cited

U.S. PATENT DOCUMENTS

| | | | |
|---|---|---|---|
| 4,065,808 | 12/1977 | Schomberg et al. | 364/200 |
| 4,254,474 | 3/1981 | Cooper et al. | 364/900 |
| 4,402,045 | 8/1983 | Krol | 364/200 |
| 4,523,274 | 6/1985 | Fukunaga et al. | 364/200 |
| 4,574,394 | 3/1986 | Holsztynski et al. | 382/41 |
| 4,627,021 | 12/1986 | Persoon et al. | 364/900 |
| 4,630,193 | 12/1986 | Kris | 364/200 |
| 4,805,129 | 2/1989 | David | 364/724.01 |
| 4,807,168 | 2/1989 | Moopenn et al. | 364/602 |
| 4,858,177 | 8/1989 | Smith | 364/900 |
| 4,906,865 | 3/1990 | Holler | 307/353 |
| 4,937,872 | 6/1990 | Hopfield et al. | 381/43 |
| 4,974,169 | 11/1990 | Engel | 364/513 |
| 4,994,982 | 2/1991 | Duranton et al. | 364/513 |

FOREIGN PATENT DOCUMENTS
242110 10/1987 European Pat. Off.

OTHER PUBLICATIONS
Bailey et al., "Why VLSI Implementations of Associative VLNS Require Connection Mutliplexing", IEEE Annual Int'l Conf. on Neural Networks, 1988, pp. 173-180.
Yasunaga et al., "A Wafer-Scale Integration Neural Network Utilizing Completely Digital Circuits", Proc. LJCNN Int'l Joint Conf. on Neural Networks, Jun. 18-22 1989 vol. 211, 213-217.
Lippmann, R. P., "An Introduction to Computing with Neural Nets", IEEE Magazine, Apr. 1987, pp. 4-22.
Proceedings of the International Conference on Systolic Arrays, San Diego, Calif., May 25th-27, 1988, pp. 163-174, IEEE, New York, US; S. Y. Kung: "Parallel Architectures for Articifical Neural Nets".
Proceedings of the 15th Annual International Symposium on Computer Architecture, Honolulu, Hawaii, May 30-Jun. 2, 1988, pp. 3-11, IEEE, New York, US; J. Ghosh et al.: "Critical Issues in Mapping Neural Networks on Message-Passing Mutlicomputers".

Primary Examiner—Allen R. MacDonald
Attorney, Agent, or Firm—Anne E. Barschall

[57] ABSTRACT

Digital data processing apparatus for use as a three-layer perceptron comprises three sets of processing cells (29A-29D, 29E-29H, 29I-29L). The data inputs of the cells of each set are connected to a respective common data bus (30,32,33) and the data outputs of the cells of each set are connected to a respective common data bus (32,33,34). Input data applied sequentially to the input bus (30) are processed in parallel by the cells (29A-29D) of the first set under the control of a clock pulse generator arrangement (35) which controls synchronized read-out of respective weighting factors from a store included in each cell, accumulation of the thus weighted items of input data, latching of the processing result in each cell, and subsequent read-out of the latched results onto the relevant output bus (32). The read-out results constitute input data for the cells (29E-29H) of the next set, which operate in the same way, as do the cells (29I-29L) of the final set. As an alternative a single set may be used recursively.

9 Claims, 5 Drawing Sheets

DIGITAL DATA PROCESSING APPARATUS USING DAISY CHAIN CONTROL

This is a continuation of application Ser. No. 07/427,411, filed Oct. 24, 1989, now abandoned.

This invention relates to digital data processing apparatus.

Figure 1:
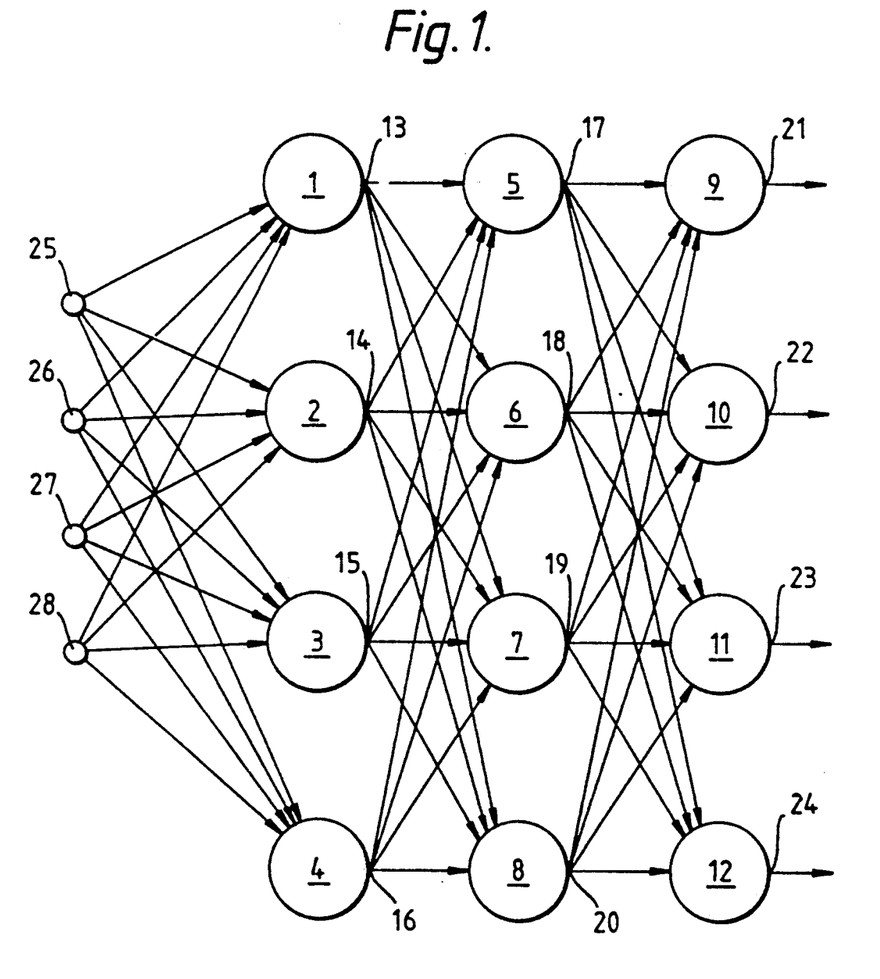
FIG. 1 shows the organisation of a multilayer perceptron which operates in an analog manner, as referred to previously.

It is sometimes required that the same set of input data items is processed several times using different sets of operands to produce respective items of output data. This is the case, for example, in each layer of a multi-layer perceptron the organisation of an analog example of which (being a type of so-called "neural network") is shown diagrammatically in FIG. 1 of the drawings. In the example shown in FIG. 1 the perceptron comprises three layers each in the form of a set of four data processing cells 1-4, 5-8 and 9-12 respectively. Each cell has four inputs and one output, the outputs 13-16 of the cells 1-4 of the first layer each being connected to a respective input of each cell 5-8 of the second layer, and the outputs 17-20 of the cells 5-8 of the second layer each being connected to a respective input of each cell 9-12 of the third layer. The outputs 21-24 of the cells 9-12 of the third layer together constitute the output of the network. Four items of input data are denoted by circles 25,26,27 and 28 respectively, each of these being applied to a respective input of each cell 1-4 of the first layer. In general each of the data processing cells 1-12 is arranged to produce an output signal which is a non-linear function of the result of subtracting a threshold value (which may be zero) from the sum of its input signals after these input signals have been weighted by multiplying them by predetermined respective weighting factors. The non-linear function may have, for example, a sigmoid form. As another example it may be obtained by means of a hard limiting process. The perceptron may be employed, for example, as a classifier for an input vector represented by the four items of input data 25-28, the resulting vector at the outputs 21-24 being indicative of to which of a plurality of classes the input vector belongs (these classes being stored in the perceptron in the form of the set of weighting factors). The choice of four cells per layer and three layers is, of course, only an example; in some cases fewer layers will suffice and, moreover, it is not even essential that each layer comprises the same number of cells.

Perceptrons are discussed, for example in an article by R. P. Lippmann entitled "An Introduction to Computing with Neural Nets" in IEEE ASSP Magazine, April 1987, pages 4-22, particularly pages 13-18. Practical implementations of neural networks up to the present time appear, in general, to employ analog circuitry (see e.g. EP-A-242110). However, it is often preferred to employ digital techniques and it is an object of the present invention to provide a digital circuit architecture which enables the multiple crossover connections inherent in the architecture shown in FIG. 1 to be avoided.

The invention provides digital data processing apparatus comprising a set of digital data processing cells for each processing, using a respective set of operands, the same set of sequential input digital data items to produce a respective item of digital output data, said cells having a common input for the set of sequential input data items and each comprising (i) an operand store having a storage location corresponding to each operand of the respective set of operands, (ii) a digital multiplier first and second inputs of which are coupled to said common data input and to a data output of the operand store respectively, for multiplying successive items of the set of sequential input digital data items by respective operands read from the operand store, (iii) an accumulator to the data input of which the output of the multiplier is coupled, for accumulating the results of the multiplications, (iv) a latch arrangement for storing and outputting the respective item of output data, and (v) data transfer means coupling the output of the accumulator to a data input of the corresponding latch, said data transfer means having a non-linear transfer characteristic and data outputs of said latch arrangements being coupled to a common data output, the apparatus including clock pulse generator means coupled to the operand stores and the latch arrangements for reading out the contents of the storage locations of each said operand store in succession and in step with the corresponding read-out of the contents of the storage locations of the other said operand stores and reading out the content of each latch arrangement in succession onto the common data output. (Although each respective set of operands will normally be different from all the others this might not necessarily be the case in all circumstances. However, it will always be the case that at least two of these sets are different from each other).

It has now been recognised that the requisite calculations in each layer of a multi-layer perceptron can be performed digitally in an efficacious manner if the cells of each layer are arranged to have a common data input and a common data output and the set of input data items for each layer is arranged to occur sequentially on the relevant common data input. The input data items can then be processed in parallel by the cells of the relevant layers and, if the results are latched and then read out sequentially onto the relevant data output, these results can act directly as the sequential input data for the next layer (if present). The respective weighting factors required for the processing in each cell can be stored therein and read out as required.

If, for example, the apparatus is required to form part of a multilayer perceptron then, as implied above, said common data output may constitute the common data input of a further such set of digital data processing cells. As an alternative, however, a single set of cells may be used recursively, the common data output thereof then being coupled to the common data input thereof. If maximum processing speed for successive sets of input data items is required then the former arrangement will be preferred, whereas if minimisation of the hardware employed takes precedence then the latter arrangement will probably be preferred. In both cases the clock pulse generator means is preferably arranged to read out the contents of each latch arrangement in succession in step with the reading out of the contents of the storage locations of the operand stores. If this is the case synchronization between the inputting of successive data items to a cell from other cells and the reading out of the relevant operands in that cell can be facilitated.

Embodiments of the invention will now be described, by way of example, with reference to the accompanying diagrammatic drawings, in which.

Figure 2:
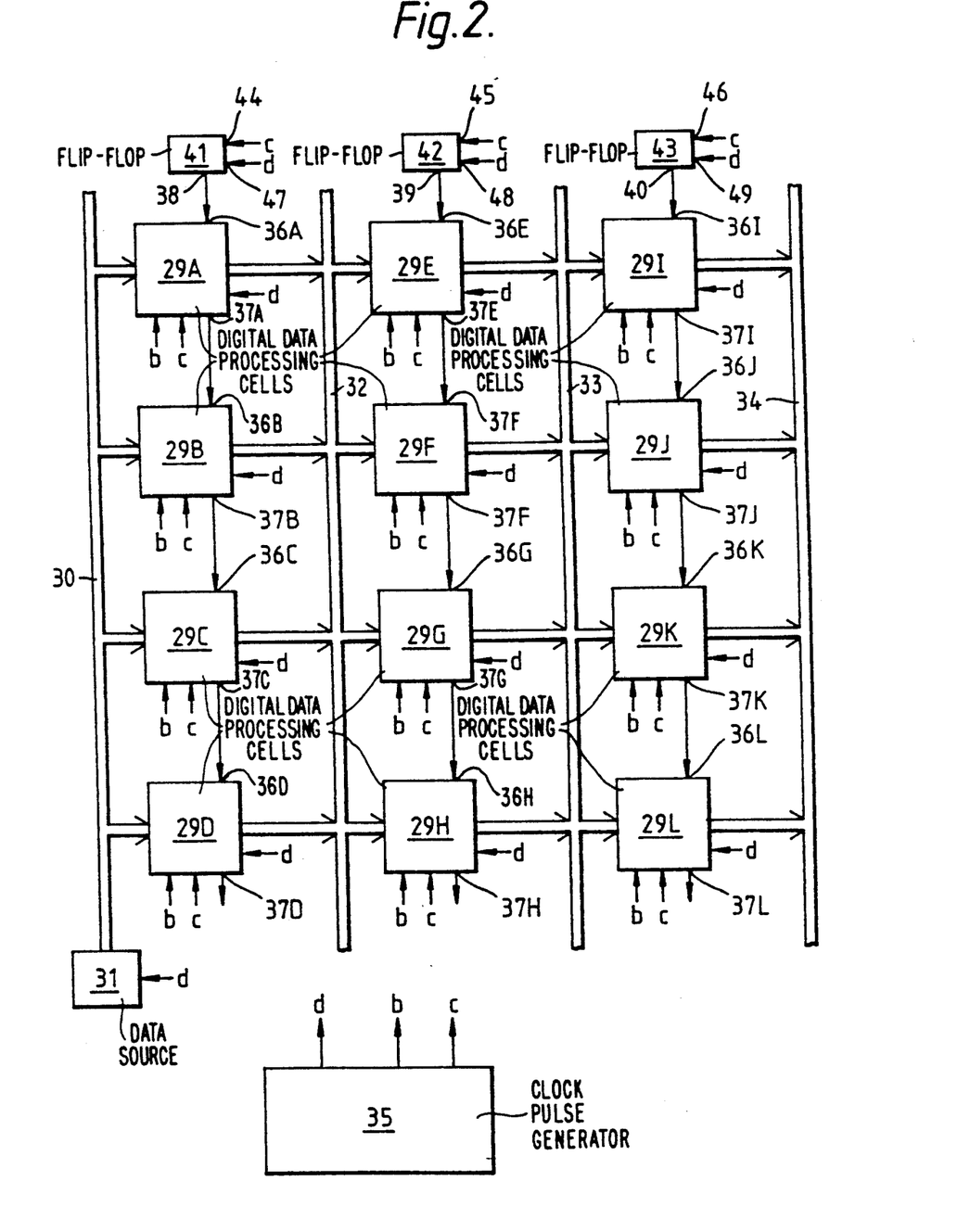
FIG. 2 is a block diagram of a first embodiment of the invention.

FIG. 2 is a block diagram of digital data processing apparatus comprising three sets of four digital data processing cells 29A–29D, 29E–29H and 29I–29L respectively. The cells of the set 29A–29D each process, using a respective set of operands, the same set of input digital data items presented sequentially to a common input constituted by a data bus 30 by a data source 31, to produce a respective item of digital output data. The resulting four items of digital output data are presented to a common data output constituted by a data bus 32 in succession; how this is done will be elaborated upon below. Data bus 32 also constitutes a common data input of the cells 29E–29H which each process, using a respective set of operands, the aforesaid four items of digital output data to produce a respective item of digital output data. The resulting four items of digital output data are presented to a common data output constituted by a data bus 33 in succession, which bus also constitutes a common data input of the cells 29I–29L. The cells 29I–29L each process, using a respective set of operands, the last-mentioned four items of digital output data to produce a respective item of digital output data. The resulting four items of digital output data are presented to a common data output constituted by a data bus 34 in succession. Each of the cells 29A–29L has three clock-pulse inputs b,c and d respectively, which are connected to corresponding outputs of a clock pulse generator arrangement 35. Output d is also connected to a clock pulse input of the data source 31 Moreover, each of the cells 29A–29L has a control signal input 36 and a control signal output 37, the control signal output 37 of each cell of each set being connected to the control signal input 36 of the next cell (if present) of the same set. The control signal inputs 36A, 36E and 36I of the first cells 29A, 29E and 29I respectively of each set are connected to the Q-outputs 38, 39 and 40 respectively of set/reset flip-flops 41,42 and 43 respectively, the set inputs 44,45 and 46 respectively of which are connected to the output c of clock pulse generator arrangement 35 and the reset inputs 47,48 and 49 respectively of which are connected to the output d of clock pulse generator arrangement 35. The control signal outputs 37D, 37H and 37L of the last cells 29D, 29H and 29L of each set are not used. Clock signals produced on the output d of the arrangement 35 control the outputting of data items by the source 31 and by the cells 29 under the co-control of signals presented to their control signal inputs 36, and also resetting of the flip-flops 41–43. Clock signals produced on the output b o: the arrangement 35 control the processing of the data items inputted to the cells 29 to produce the respective items of output data. Clock signals produced on the output c of the arrangement 35 control the latching of the said respective items of output data in the cells 29 prior to their outputting. The manner in which this is achieved will now be described with reference to FIGS. 3 and 4.

Figure 3:
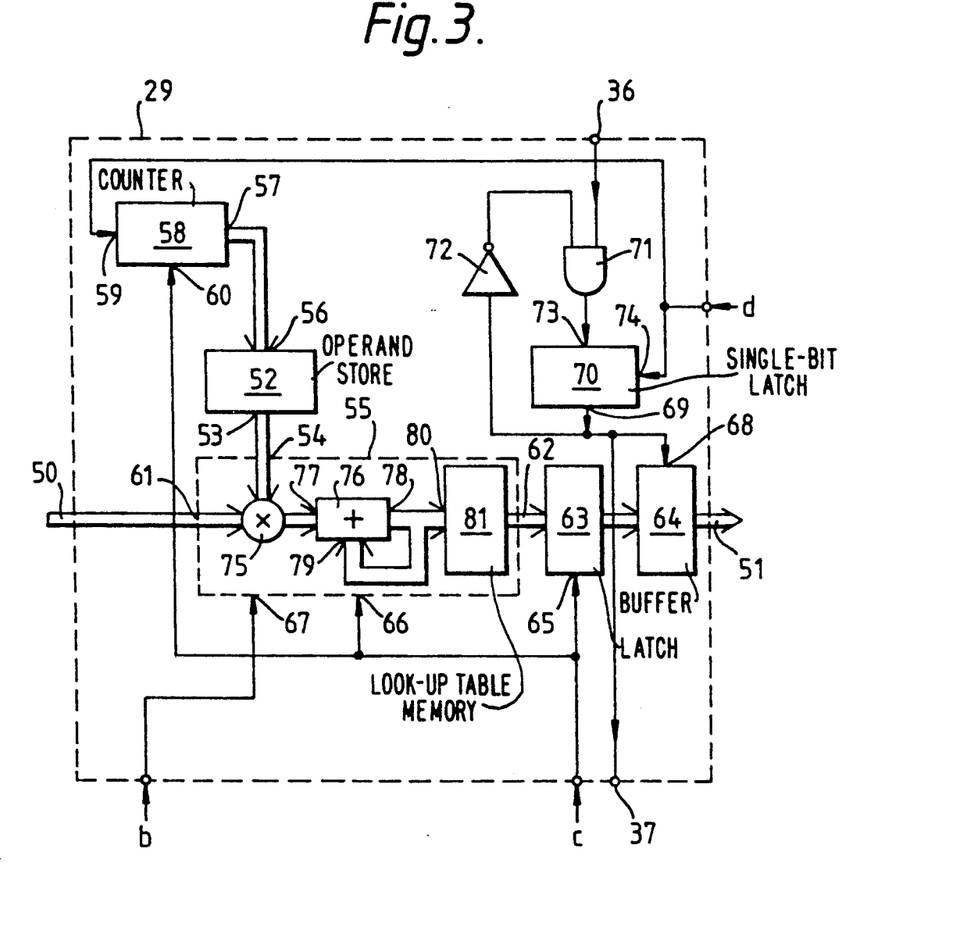
FIG. 3 shows a possible construction for several of the blocks of FIG. 2 in more detail.
Figure 4:
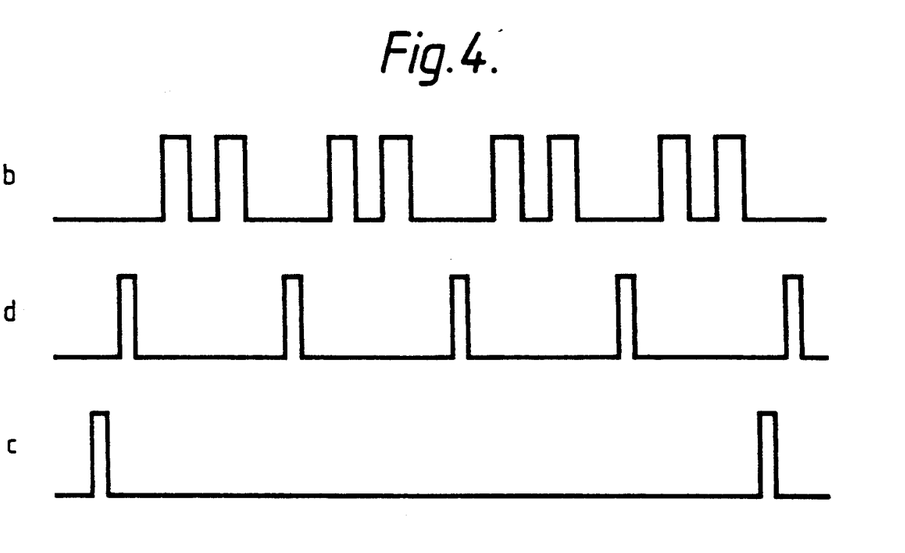
FIG. 4 shows some clock pulse waveforms occurring in the embodiment of FIGS. 2 and 3.

FIG. 3 is a block diagram showing a possible construction for each of the cells 29 of FIG. 2. As shown in FIG. 3 the cell 29 has a data input 50 (connected to the bus 30,32 or 33 of FIG. 2) and a data output 51 (connected to the bus 32,33 or 34 of FIG. 2). It comprises an operand store 52 the data output 53 of which is connected to a data input 54 of digital data processing means 55 and the address signal input 56 of which is connected to the parallel output 57 of a counter 58. The clock signal input 59 of counter 58 is connected to the output d of the clock signal generator arrangement 35 of FIG. 2 and the reset signal input 60 of counter 58 is connected to the output c of arrangement 35. The cell data input 50 is connected to a further data input 61 of processing means 55 and the data output 62 of processing means 55 is coupled to the cell data output 51 via a latch arrangement comprising a latch circuit 63 and a buffer circuit 64 which has a three-state output. The latch control signal input 65 of latch circuit 63 is connected to the output c of the clock pulse generator arrangement 35 of FIG. 2, as is a reset signal input 66 of the processing means 55. A clock signal input 67 of processing means 55 is connected to the output b of clock pulse generator arrangement 35 of FIG. 2. The output enable control signal input 6B of buffer circuit 64 is connected to the output 69 of a single-bit second latch circuit 70, which output is also connected to one input of an AND gate 71 via an inverter 72. The other input of AND gate 71 is connected to the control signal input 36 of the cell and the output of AND gate 71 is connected to the data signal input 73 of latch circuit 70. The latch control signal input 74 of latch circuit 70 is connected to the output d of the clock pulse generator arrangement 35 of FIG. 2. The digital data processing means 55 comprises a digital multiplier 75 to the two inputs of which are coupled the data inputs 54 and 61 respectively, a digital adder/accumulator 76 to one input 77 of which the output of multiplier 75 is coupled and the output 78 of which is coupled to the other input 79. The output 78 is also coupled to the address signal input 80 of a suitably programmed look-up table memory 81 the data output of which constitutes the output 62 of processing means 55.

The arrangement so far described with reference to FIGS. 2 and 3 operates as follows, it being assumed as an example that the processing means 55 of each cell 29 processes each digital data item presented to the input 50 under the control of two clock pulses presented to its input 67 and that each cell 29 processes four items of input digital data to produce one item of output digital data. This being the case the clock pulse generator arrangement 35 of FIG. 2 is arranged to produce the clock pulse signals shown in FIG. 4 at its outputs b, d and c respectively. (To this end arrangement 35 may comprise a clocked counter provided with three suitably chosen decoder circuits connected to its parallel output) As will be seen from FIG. 4, two pulses are produced at output b between each pair of successive pulses produced at output d, and one pulse is produced at output c just prior to each group of four pulses produced at output d. Each c-pulse activates the latch circuit 63 included in each cell 29 to store the data item currently present at the output 62 of the corresponding data processing means 55, resets processing means 55 to an initial state in which the contents of adder/accumulator 76 are zero, and also resets counter 58 to zero. The c-pulse also sets the flip-flops 41–43 of FIG. 2. If it is assumed that the contents of all the latch circuits 70 are initially zero, so that the control signals applied to the control signal inputs 68 of all the three-state buffers 64 are all logic "0", as are the outputs 37 of all the cells, the result of each c-pulse as far as the cell outputs is concerned is that the latch circuits 63 become loaded with the current output data items from the respective processing means 55, whereas the cell data outputs 51 are all initially disabled. Because flip-flops 41–43 are now in the set state the inputs 36A, 36E and 36I of the cells 29A, 29E and 29I of FIG. 2 are all logic "1", whereas the corresponding inputs of all the other cells are logic "0". The outputs of the AND gates 71 in the cells 29A, 29E and 29I are therefore all logic "1" whereas those of the other AND gates 71 are all logic "0". The result is that when the next d-pulse appears, a "1" is loaded into the latch circuits 70 of the cells 29A, 29E and 29I (only) enabling the output buffers 64 of these cells while the output buffers 64 of the other cells remain disabled. The flip-flops 41–43 are reset by this d-pulse. Thus the output data items stored in the latches 63 of the cells 29A, 29E and 29I are put onto the buses 32, 33 and 34 respectively. When the next d-pulse appears a logic "0" is loaded into the latches 70 of the cells 29A, 29E and 29I (because their inputs 36 are logic "0"), disabling the corresponding buffers 64, whereas a logic "1" is loaded into the latches 70 of the cells 29B, 29F and 29J (because their inputs 36 are logic "1"), enabling the corresponding buffers 64. The output data of the cells 29A, 29E and 29I on the buses 32, 33 and 34 respectively is therefore replaced by the output data of the cells 29B, 29F and 29J respectively. The two subsequent d-pulses give rise to similar operations, the output data of cell 29B on bus 32 being replaced in succession by the output data of cell 29C and then of 29D, the output data of cell 29F on bus 33 being replaced in succession by the output data of cell 29G and then of 29H, and the output data of cell 29J on bus 34 being replaced in succession by the output data of cell 29K and then of 29L. The four d-pulses also activate source 31 to present four successive items of input data to bus 30.

The b-pulses control the operation of the various processing means 55. After a c-pulse the next d-pulse, in addition to causing a data item to be put on to each of the buses 30,32 and 33 as just described, increments the counters 58, with the result that the output of each counter 58 addresses the first storage location in the corresponding store 52, the operand stored in this location being presented to the input 54 of the corresponding processing means 55. This of course coincides with the presentation of an input data item to the other input 61 of the relevant processing means from the bus 30,32 or 33 to which it is connected. Under the control of the next two b-pulses the input data item is multiplied by the operand in the multiplier 75 and the result is added to the contents (zero) of the adder/accumulator 76. The next d-pulse similarly increments the counters 58 once again, causing the operand contained in the second storage location of each store 52 to be presented to the input 54 of the corresponding processing means 55. The new input data item now present on the other input 61 of the relevant processing means is therefore then multiplied by this operand and the result added to the contents of the relevant accumulator/adder 76. This process is repeated until in the present case four input data items have been processed in this way, after which the next c-pulse causes the results, modified by means of the look-up tables 81, to be loaded into the latches 63 and the various processing means 55 and counters 58 to be reset once again. Thus, provided that the look-up tables are suitably programmed, the items of input data serially presented to each cell 29 are processed in exactly the way required of each perceptron cell 1-12 of FIG. 1, the cells 29A-29D corresponding to the cells 1-4 of FIG. 1, the cells 29E-29H corresponding to the cells 5-8, and the cells 29I-29L corresponding to cells 9-12. The output data items of the cells of each layer are presented serially to the input of each cell of the next layer exactly as required. The programming of the various look-up tables 81 will of course be determined by the exact form of non-linear relationship required between the weighted sums produced at the output of the accumulator/adders 76 and the resulting items of output data loaded into the latches 63.

It will be appreciated that the number of cells in each layer or set of FIG. 2 may be chosen at will, the number of d-pulses per c-pulse being chosen accordingly. If it is required that a given layer contains more cells than another layer then the "short" layer(s) may be made up to the same length by means of dummy cells which always give an output of zero, so that the read-outs of the output data from all the cells of a layer recur with a frequency which is the same for each layer. Alternatively the cells of the various layers may be controlled by suitably chosen different sets of clock pulses, to achieve the same result.

It will be appreciated that the repetitive nature of the array of cells 29 shown in FIG. 2 implies that a practical implementation thereof may take the form of a set of interconnected integrated circuits each of which constitutes a given number of adjacent cells, for example adjacent cells of a column, adjacent cells of a row, or adjacent cells of more than one column and row. Thus an array of any required size can be obtained in a simple manner by interconnecting the requisite number of such integrated circuits.

Because the processing in each layer of the apparatus of FIG. 2 is of the same kind it is possible to achieve a saving in hardware, at the expense of an increase in processing time, by using a single layer recursively. An example of how this can be done will now be described with reference to FIG. 5 of the drawings which is a block diagram of digital data processing apparatus comprising a single set of four digital data processing cells 82A-82D which may be each constructed as described with reference to FIG. 3 with the exception that each operand store therein contains three times as many storage locations as those contained in the operand store 52 of FIG. 3 and the reset input of the addressing counter for this store is connected to a further input e of the cell rather than to the input c (c.f. input 60 in FIG. 2). Components of the apparatus of FIG. 5 which have counterparts in the apparatus of FIG. 2 have been given the same references.

Figure 5:
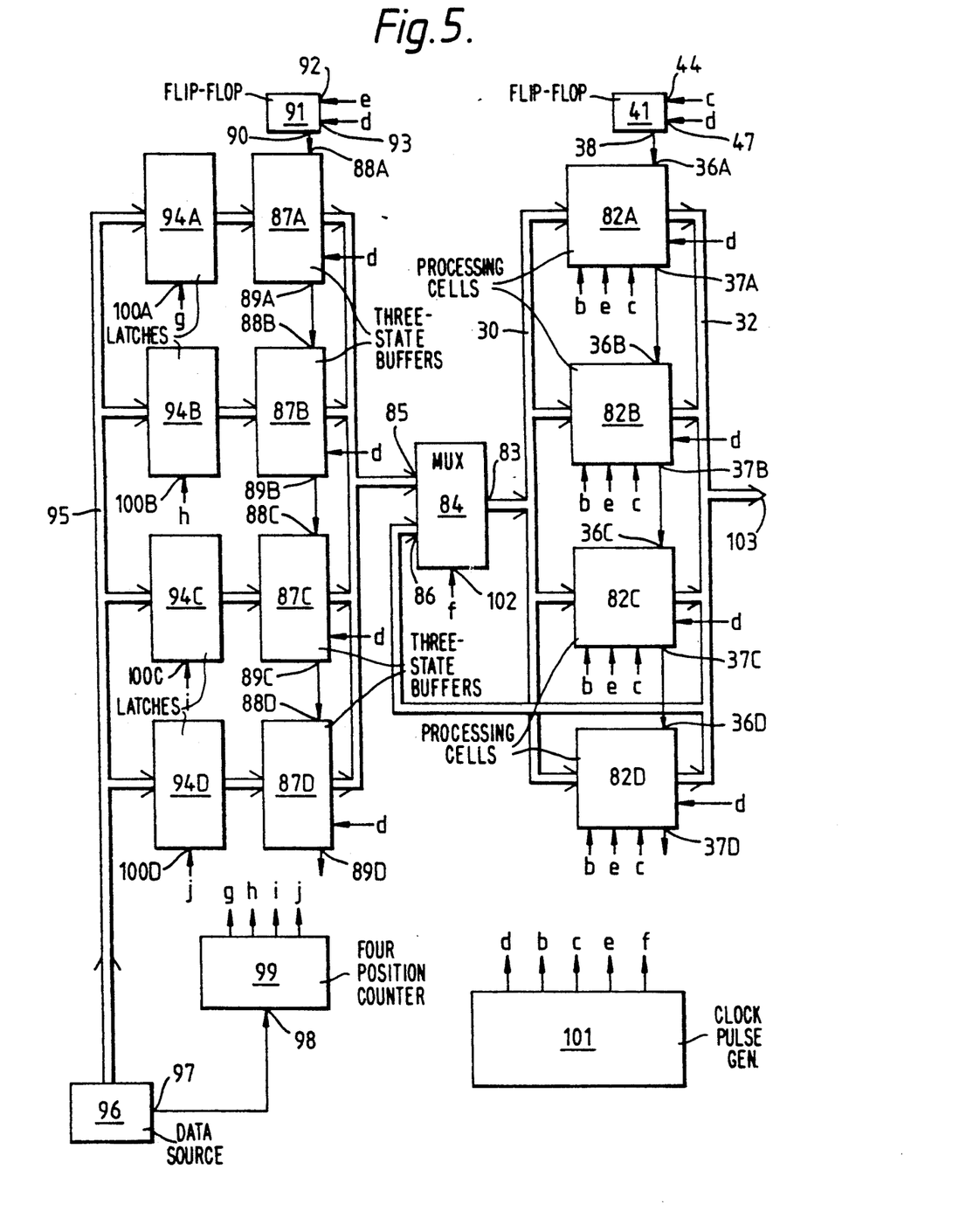
FIG. 5 is a block diagram of a second embodiment of the invention.

As will be seen from FIG. 5, the data bus 30 is now connected to the output 83 of a data multiplexer 84 having two inputs 85 and 86. The input 86 is connected to the bus 32 whereas the input 85 is connected to the paralleled data outputs of a set of four three-state buffer arrangements 87A–87D. Each arrangement 87 is in fact configured in the same way as the components 64, 70, 71 and 72 of FIG. 3 and in consequence has a control signal input 88 corresponding to 36 in FIG. 3, a control signal output 89 corresponding to 37 in FIG. 3, and an input for the clock signal d. Each control signal output 89 is connected to the control signal input 88 of the next arrangement of the set (if present) and the control signal input 88A of the first arrangement of the set is connected to the Q-output 90 of a set-reset flip-flop 91 having a set input 92 and a reset input 93. The data inputs of the buffer arrangements 87A-87D are connected to the data outputs of latches 94A-94D respectively the data inputs of which are connected in parallel to a data bus 95. Data bus 95 is fed with data by means of a data source 96 which has a synchronizing signal output 97. This output 97 is connected to the clock signal input 98 of a four-position counter 99 which produces a logic 1 on a respective one of four outputs g,h,i and j when its contents are equal to any of the four possible values. The outputs g,h,i and j are connected to latch signal inputs 100A, 100B, 100C and 100D respectively of the latches 94A-94D respectively. In consequence, if source 96 outputs four data items in succession (with corresponding synchronzing pulses on output 7) these data items will be stored in the latches 94A, 94B, 94C and 94D respectively.

Figure 6:
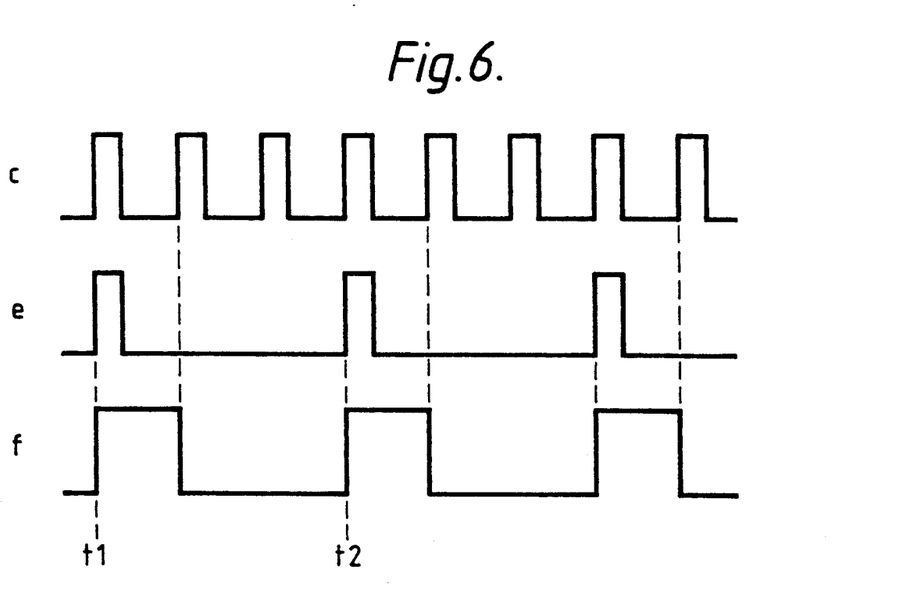
FIG. 6 shows some clock pulse waveforms occurring in the embodiment of FIG. 5.

The apparatus of FIG. 5 includes a clock pulse generator arrangement 101 which is constructed to produce clock pulses at outputs b,c,d,e and f thereof. The relationship between the b-, c- and d-pulses is the same as that shown in FIG. 4. The relationship of the e- and f-pulses to the c-pulses is shown in FIG. 6, from which it will be seen that an e-pulse coincides with every third c-pulse and an i-pulse starts at the same time as each e-pulse and terminates when the next c-pulse occurs. The b-, c- and d-pulses are fed to respective inputs of the cells 82, similarly to the cells 29 of FIG. 2, and the c- and d-pulses are fed to the set and reset inputs respectively of flip-flop 41, similarly to its counterpart in FIG. 2. The d-pulses are also fed to the relevant inputs of the buffer arrangements 87 (see above) and also to the reset input 93 of flip-flop 91. The e-pulses are fed to the relevant inputs of the cells 82, i.e. to the reset inputs of the addressing counters included therein (see above), and also to the set input 92 of flip-flop 91. The f-pulses are fed to the control input 102 of multiplexer 84 which is arranged to connect its input 85 to its output 83 when the signal at input 102 is logic "1", and to connect its input 86 to its output 83 otherwise.

Suppose that at the instant denoted by t1 in FIG. 6 each latch 94 in FIG. 5 contains a data item which has been loaded from source 96 and each cell 82 contains a data item resulting from previous processing. At instant t1 flip-flops 41 and 91 are set by the c- and e-pulses respectively, the data items in the cells 82 are latched by the e-pulse, the addressing counters in the cells 82 are reset by the e-pulse, and multiplexer 84 reacts to the f-pulse by connecting its input 85 to its output 83. The following four d-pulses cause the data items in the cells 82A-82D to be read out in succession to an output 103, and the data items in the latches 94A-94D to be applied in succession to the multiplexer input 85 and thence to the bus 30 and the cells 82 in which they are processed using operands stored in the first four locations of the respective operand stores due to the clocking of the addressing counters by the d-pulses. The first of these d-pulses resets the flip-flops 41 and 91. When the next c-pulse occurs the data items resulting from the latest processing in the cells 82 are latched therein and flip-flop 41 is set once again. The termination of the f-pulse causes multiplexer 84 to adopt its other state, connecting bus 32 to bus 30. The following four d-pulses cause the data items latched in the cells 82 to be read in succession onto the bus 32 and thence to the cell inputs via multiplexer 84. These items are processed in the cells 82 using the operands stored in the next four locations of the respective operand stores due to the continued clocking of the addressing counters. When the next c-pulse occurs the data items resulting from this latest processing are latched in the cells 82 after which they are read out in succession under the control of the next four d-pulses and applied to the inputs of the cells 82 via multiplexer 84. These data items are processed in the cells 82 using the operands stored in the next four locations of the operand stores after which a new cycle commences at instant t2. In total, therefore, the set of cells 82A-82D of FIG. 5 processes data in the same way as the three sets 29A-29D, 29E-29H and 29I-29L of FIG. 2, albeit at only one third of the overall rate.

If a further reduction in the overall rate of data processing can be tolerated the multiplexer 84 may be omitted, the bus 32 and the outputs of the buffer arrangements 87 being connected directly to the bus 30. (The reason that this will result in a further reduction in the overall data processing rate is that data can obviously no longer be outputted from the buffer arrangements 87 at the same time as data is being presented from the cells 82 to the output 103). In such a case the e- and f-pulse trains shown in FIG. 6 will have to be modified so that an e-pulse replaces every fourth c-pulse rather than coincides with every third c-pulse, an f-pulse still being present between every e-pulse and the next c-pulse.

It will be evident to those skilled in the art that many modifications are possible to the embodiments described within the scope of the invention as defined by the claims. For example the individual addressing counter 58 of FIG. 3 provided in each cell 29 (and 82 of FIG. 5) may be replaced by a single counter which is common to all the cells. As another example the manner in which the contents of the latch (63 in FIG. 3) of the various cells of a layer or set are read in succession onto a common data output may be different; the latches may, for example, be connected in a shift register type of configuration from which the data loaded into the various stages is shifted out to the data output by the d-pulses. As described, it has been assumed that two clock pulses (the b-pulses of FIG. 4) are required to control the processing means 55 of FIG. 3 to process each item of input data, for example one to activate the multiplier 75 and one to subsequently activate the adder/accumulator 76. Obviously this is not necessarily the case. If, for example, only one such pulse is required the separate pulse train b could possibly be dispensed with altogether, the relevant inputs of the cells 29 being fed with the d-pulse train instead.

From reading the present disclosure, other modifications will be apparent to persons skilled in the art. Such modifications may involve other features which are already known in the design, manufacture and use of data processing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:
1. Digital data processing apparatus comprising
   a) a common input for receiving a set of sequential input digital data items;
   b) a common output
   c) a set of digital data processing cells for processing the set of sequential input digital data items, each cell comprising
      i) respective input means coupled with the common input for receiving the set of sequential input data items, so that all of the ells process the same data,
      ii) a respective output for supplying a respective item of digital output data to the common output;
      iii) a respective operand store comprising a respective plurality of storage locations, each storage location being for storing a respective operand;
      iv) a respective digital multiplier, having a first input coupled to the respective input means and a second input coupled to a data output of the respective operand store, for multiplying successive items of the set of sequential input digital data items by the respective operands;
      v) a respective accumulator, having a data input coupled to an output of the respective multiplier, for accumulating results of multiplications performed by the respective multiplier;
      vi) a respective latch arrangement for storing and outputting the respective item of digital output data; and
      vii) respective data transfer means, coupling an output of the respective accumulator to a data input of the respective latch arrangement, having a non-linear characteristic transfer function;
   d) clock pulse generator means, coupled to the respective operand stores and the respective latch arrangements, for causing:
      i) the storage locations, of each operand store, to output their respective operands in a first predetermined order and according to a timing which is coordinated with timings of output of corresponding respective operands from storage locations of the other operand stores; and
      ii) the latch arrangements to output their contents onto the common output in a second predetermined order,
   so that the output from each cell is presented to the common output in turn, whereby no bus arbitration is needed.

2. Apparatus as claimed in claim 1, wherein said common data output constitutes the common data input of a further such set of digital data processing cells.

3. The apparatus of claim 2 wherein the clock pulse generating arrangement causes the latch arrangements to output their contents according to a timing which is coordinated with the output of the respective operands.

4. apparatus as claimed in claim 1 wherein said common data output feeds back to said common data input, so that said cells operate recursively.

5. The apparatus of claim 4 wherein the clock pulse generating arrangement causes the latch arrangements to output their contents according to a timing which is coordinated with the output of the respective operands.

6. A digital data processing system comprising a plurality of apparatuses as claimed in claim 1, including a first apparatus and at least one next apparatus, arranged so that the common input of each next apparatus is the common output of a previous one of the apparatuses, whereby the apparatuses form layers of the system.

7. The apparatus of claim 1 wherein
   at least one of the cells comprises a control input for receiving control data from another cell.

8. The apparatus of claim 1 wherein
   at least one of the cells comprises a control output for supplying control data to another cell.

9. The apparatus of claim 1 wherein each of the cells comprises
   a respective control input for receiving control data; and
   a respective control output for supplying control data; and the cells are arranged in a daisy chain, with the respective control input of each next cell being coupled to the respective control output of a previous one of the cells, for sequential presentation of cell outputs to the common output.

* * * * *